(12) United States Patent
Manjunath et al.

(10) Patent No.: US 11,178,191 B2
(45) Date of Patent: Nov. 16, 2021

(54) METHOD AND APPARATUS FOR OPTIMIZING RESOURCES IN IP MULTIMEDIA SUBSYSTEM (IMS) NETWORK

(71) Applicant: Samsung Electronics Co., Ltd., Gyeonggi-do (KR)

(72) Inventors: Gorur Madhusudan Manjunath, Bangalore (IN); Srinivasa Rao Adusumilli, Bangalore (IN); Vijay Sangameshwara, Bangalore (IN)

(73) Assignee: Samsung Electronics Co., Ltd

( * ) Notice: Subject to any disclaimer, the term of this patent is extended or adjusted under 35 U.S.C. 154(b) by 139 days.

(21) Appl. No.: 16/345,976

(22) PCT Filed: Oct. 27, 2017

(86) PCT No.: PCT/KR2017/012029
§ 371 (c)(1),
(2) Date: Apr. 29, 2019

(87) PCT Pub. No.: WO2018/080245
PCT Pub. Date: May 3, 2018

(65) Prior Publication Data
US 2020/0067991 A1    Feb. 27, 2020

(30) Foreign Application Priority Data

Oct. 28, 2016  (IN) .............................. 201641037128
Oct. 25, 2017  (IN) .............................. 201641037128

(51) Int. Cl.
*H04L 29/06*     (2006.01)

(52) U.S. Cl.
CPC .... *H04L 65/1016* (2013.01); *H04L 29/06217* (2013.01); *H04L 65/1006* (2013.01); *H04L 65/1069* (2013.01); *H04L 65/1073* (2013.01)

(58) Field of Classification Search
CPC ....................................................... H04L 29/06
See application file for complete search history.

(56) References Cited

U.S. PATENT DOCUMENTS

2010/0098093 A1   4/2010  Ejzak
2013/0287012 A1  10/2013  Pragada et al.
(Continued)

FOREIGN PATENT DOCUMENTS

| JP | 2015-520556 | 7/2015 |
| KR | 10-1280281 | 7/2013 |

OTHER PUBLICATIONS

Indian Examination Report dated Oct. 5, 2020 issued in counterpart application No. 201641037128, 5 pages.

*Primary Examiner* — Sulaiman Nooristany
(74) *Attorney, Agent, or Firm* — The Farrell Law Firm, P.C.

(57) ABSTRACT

Embodiments herein disclose methods and systems for optimizing resources in an IP multimedia subsystem (IMS) network, wherein a method includes receiving capabilities of contacts present in the contact book in response to a request sent by an OPTIONS applications server (AS) to the contacts present in the contact book. Further, the method includes aggregating the capabilities of the contacts present in the contact book. Further, the method includes transmitting the aggregated capabilities of the contacts present in the contact book to the UE through a PNT server. Further, the embodiments include fetching updated capabilities of user equipment (UE) by the presence AS through the PNT server. Further, the embodiments include receiving a metadata in response to the received service request using push notifications through the PNT server. Further, the embodiments include registering the UE with the IMS network, if the IMS client is capable of in-call service.

6 Claims, 7 Drawing Sheets

(56) References Cited

U.S. PATENT DOCUMENTS

| | | | |
|---|---|---|---|
| 2015/0195704 A1* | 7/2015 | Buzescu | H04W 8/22 455/435.1 |
| 2015/0208447 A1* | 7/2015 | Kim | H04L 65/104 455/450 |

* cited by examiner

[Fig. 1]
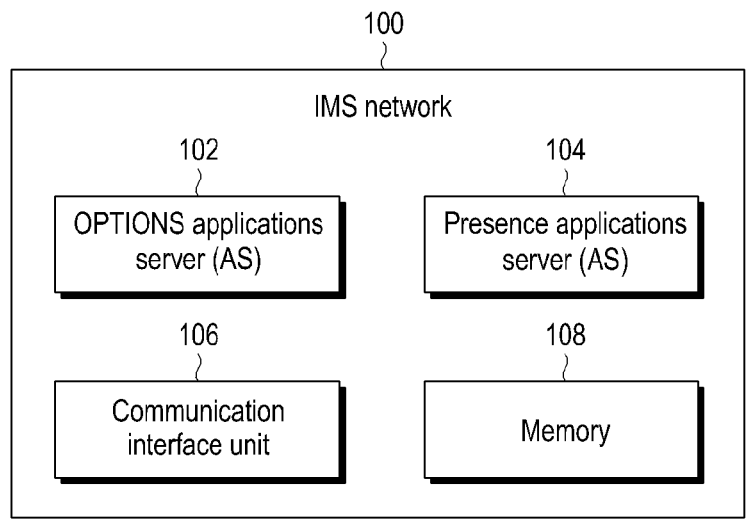
[Fig. 2]
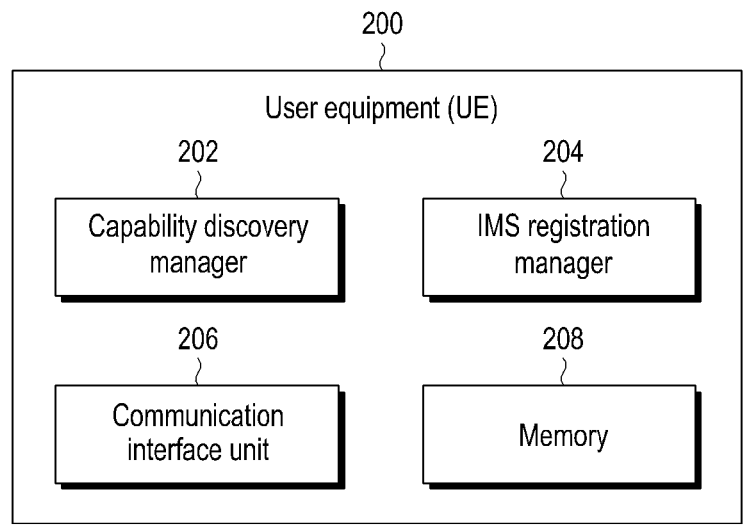

[Fig. 3]
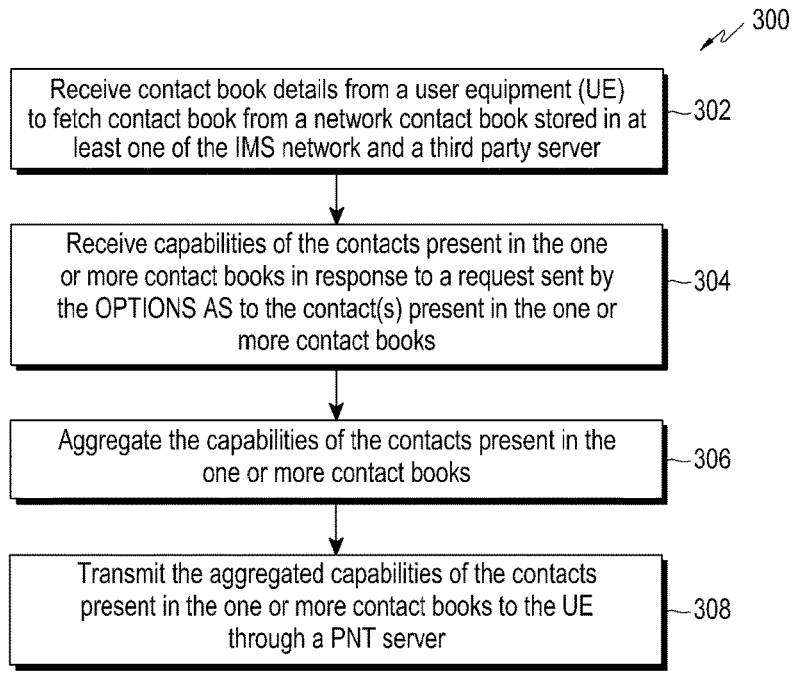
[Fig. 4]
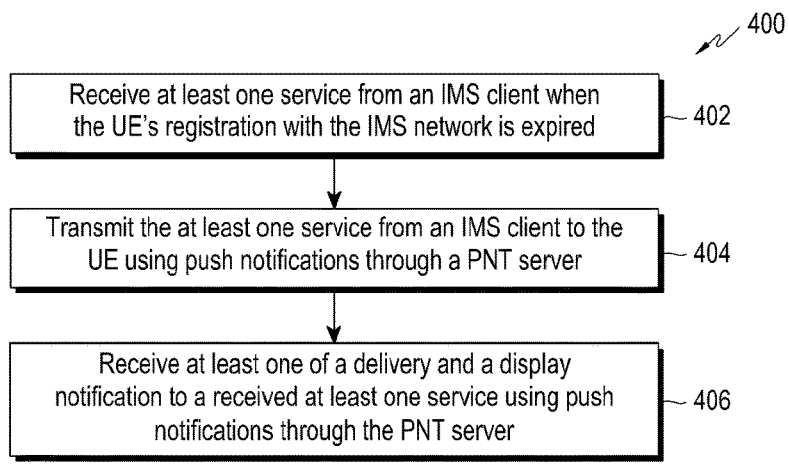
[Fig. 5]
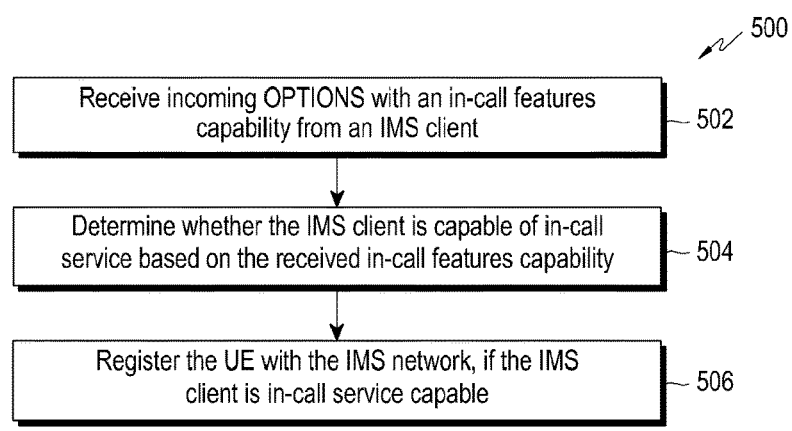

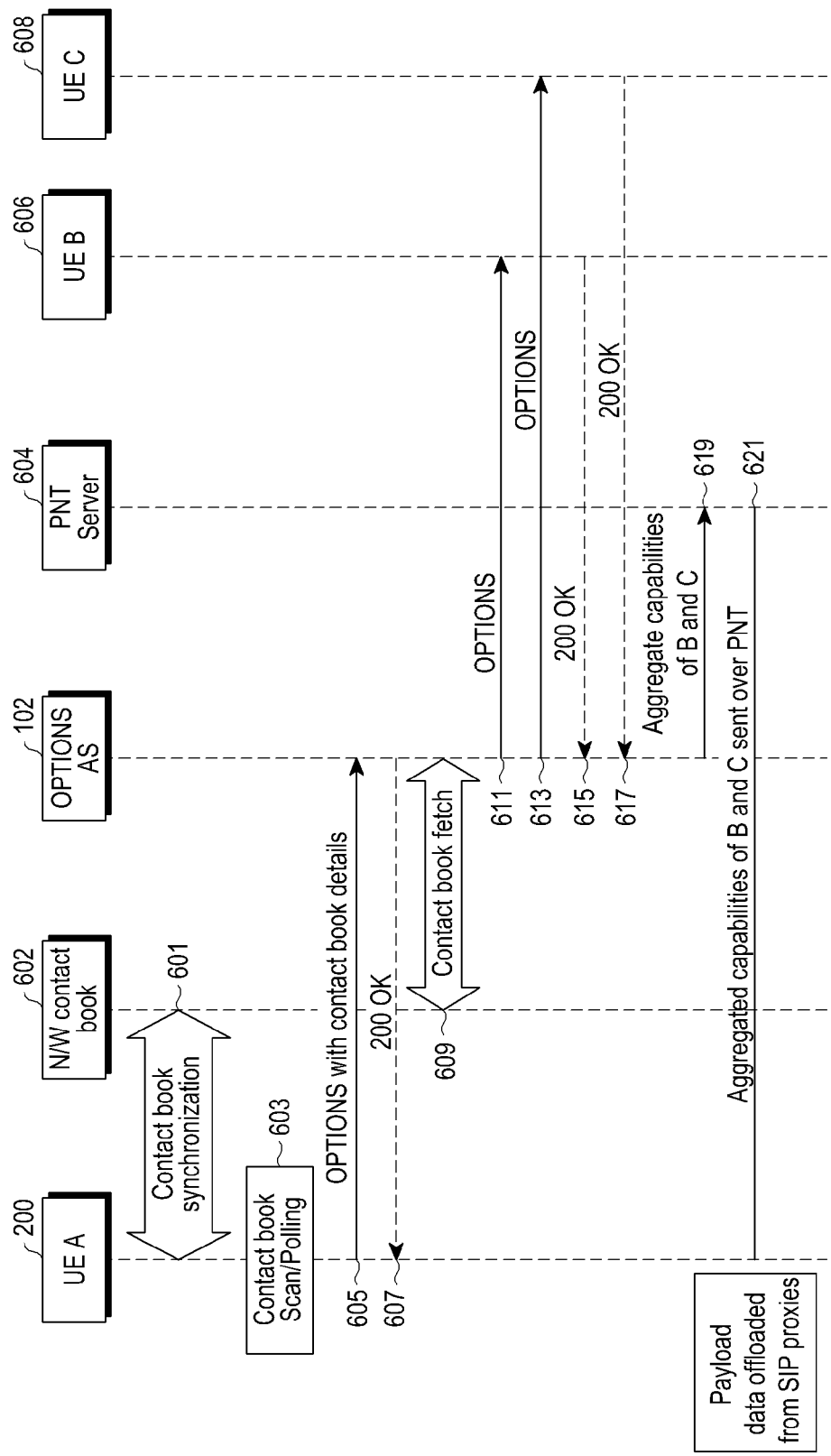
[Fig. 6a]

[Fig. 6b]
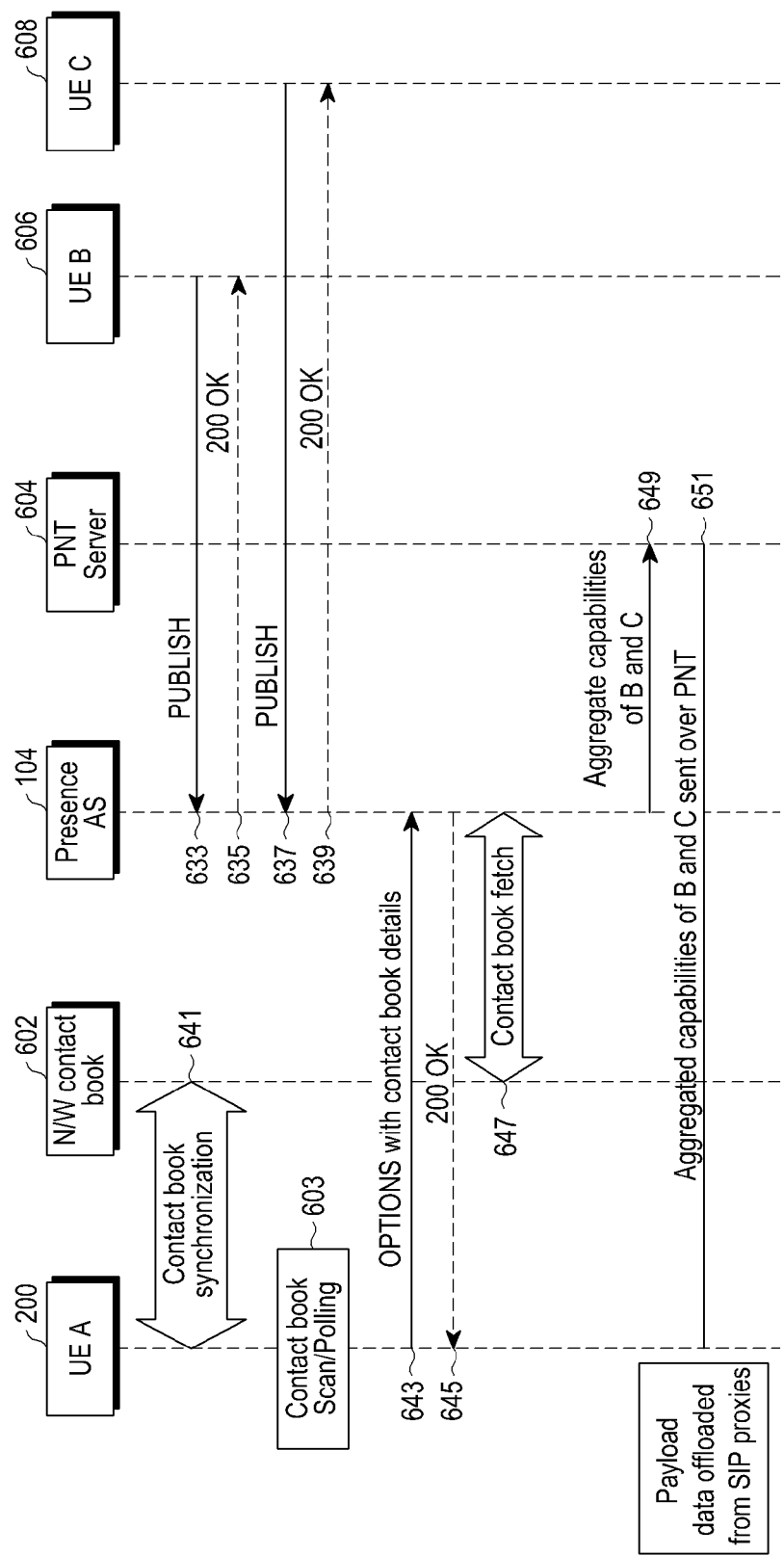

[Fig. 7]
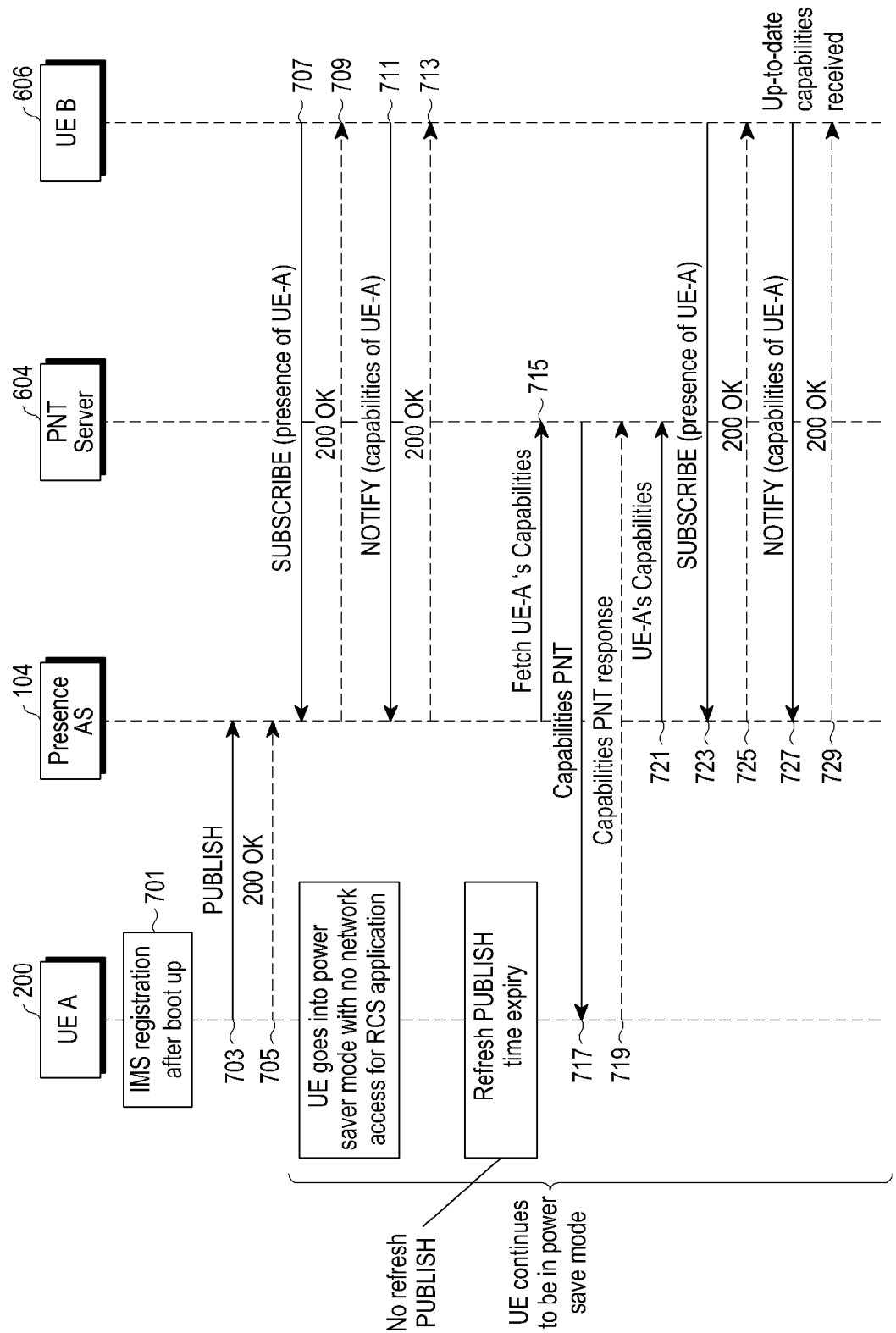

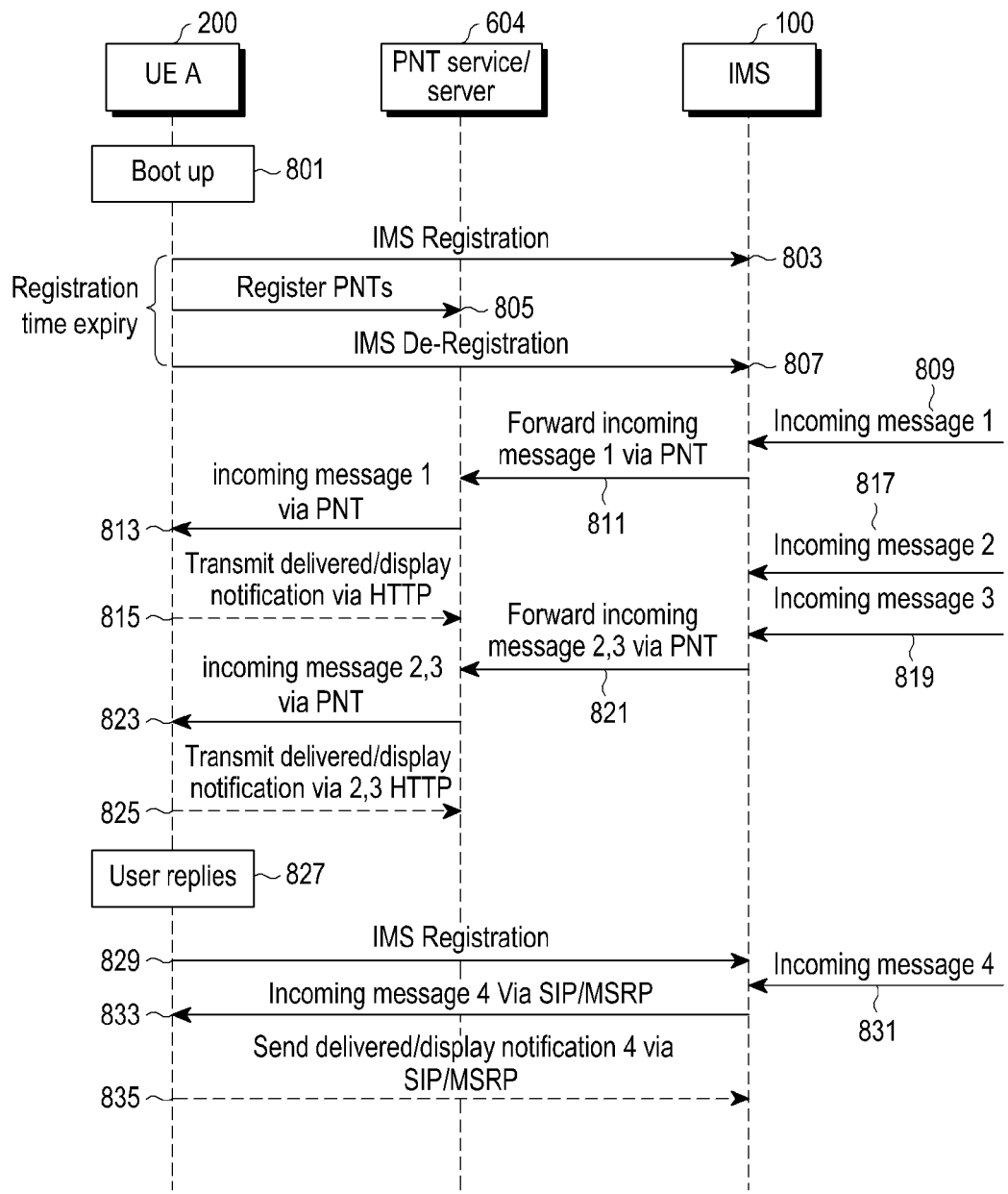
[Fig. 8]

[Fig. 9]
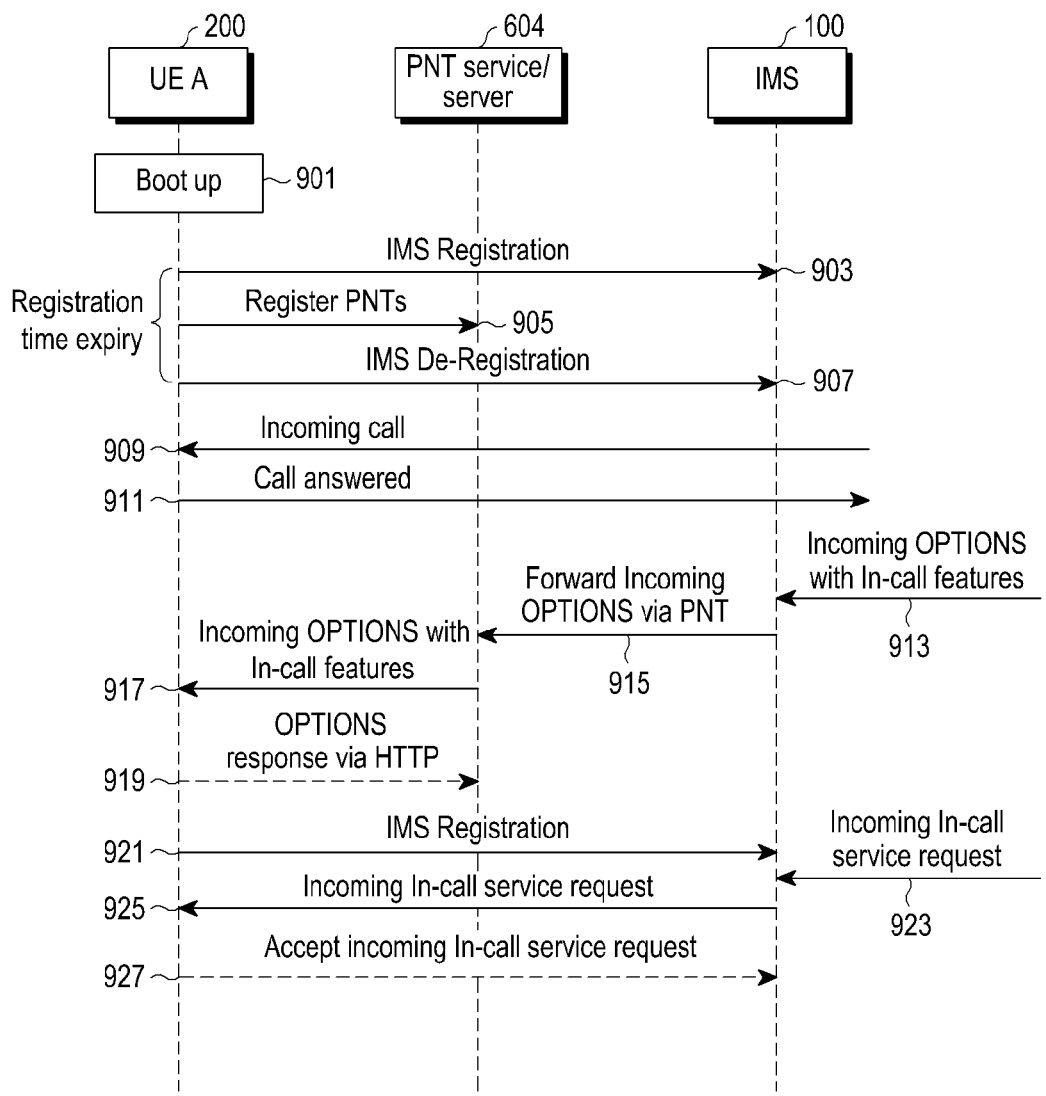

METHOD AND APPARATUS FOR OPTIMIZING RESOURCES IN IP MULTIMEDIA SUBSYSTEM (IMS) NETWORK

PRIORITY

This application is a National Phase Entry of International Application No. PCT/KR2017/012029, which was filed on Oct. 27, 2017, and claims priority to Indian Patent Application Nos. 201641037128 (PS) and 201641037128 (CS), which were filed on Oct. 28, 2016 and Oct. 25, 2017, respectively, the content of each of which is incorporated herein by reference.

TECHNICAL FIELD

The present disclosure relates to the field of IP Multimedia Subsystem (IMS) networks and more particularly to optimizing resources in the IMS network.

BACKGROUND ART

An Internet Protocol Multimedia Subsystem/IP Multimedia Subsystem (IMS) is an architectural framework for delivering IP multimedia services like audio/video (VoLTE/ViLTE) calls, Rich Communication Services (RCS) like chat/group chat, file transfer, image/video share, enriched calls or the like. An RCS client shall be registered to an IMS network in order to take part in the RCS services. Similarly, a VoLTE client shall be registered to IMS network to provide call services. These registrations can be either single or dual based on the operator policy.

The RCS client maintains its IMS registration independently of the actual user activity. Even the inactive RCS users, i.e. the users that are not engaged in RCS services and consequently not transmitting or receiving RCS traffic, may consume IMS network resources, which make managing the network resources a real challenge for mobile network operators.

Furthermore, in case of dual registration, the RCS registration is not efficiently utilized when the RCS services are inactive based on the user's activity.

RCS Clients use IMS networks for RCS Services like Capability Discovery and so on which are resource and bandwidth intensive. These services result in an increased use of resources in the network and in the UE. The bandwidth requirements are also higher, as a larger amount of data has to be communicated. This can adversely affect the performance of the network and the UE.

DISCLOSURE OF INVENTION

Technical Problem

Currently, to perform in-call services, the UE has to be already registered, when the UE receives a call. But in cases where the call is in between a non-RCS user and a RCS capable user, IMS registration is not even required. These IMS registrations can result in unnecessary network resource usage.

Furthermore, when an RCS enabled UE performs full scan of its contact book with N contacts, a. When OPTIONS based capability discovery is enabled to fetch the capabilities of the N contacts present in the contact book, it results in 2*N SIP Messages (N OPTIONS requests+N OPTIONS responses).

b. When Presence based capability discovery is enabled to fetch the capabilities of the N contacts present in the contact book, it results in 4*N SIP Messages (SUBSCRIBE request, response and NOTIFY request, response for each contact).

This results in significant amount of traffic in terms of data/payload carried by these SIP signaling messages, which is not of much importance to the SIP Proxies despite being parsed by each and every SIP Proxy leading to increase of latency at the SIP proxies.

Solution to Problem

The principal object of the embodiments herein is to disclose method and apparatus for optimizing resources in an IP multimedia subsystem (IMS) network by leveraging push notification enablers, wherein a method includes receiving a contact book details from user equipment to fetch a contact book from a network contact book stored in the IMS network or any other third party network. Further, the method includes receiving capabilities of the contacts present in the contact book in response to a request sent by the OPTIONS applications server (AS) to the contacts present in the contact book. Further, the method includes aggregating the capabilities of the contacts present in the contact book. Further, the method includes transmitting the aggregated capabilities of the contacts present in the contact book to the UE through a Push Notifications (PNT) server.

Another object of the embodiments herein is to disclose method and apparatus for transmitting the aggregated capabilities of the contacts present in the contact book to the UE by the Presence AS comprising aggregating the capabilities of the contacts present in the contact book and transmitting the aggregated capabilities of the contacts to the UE through a PNT server using push notifications.

Another object of the embodiments herein is to disclose fetching updated capabilities of the UE from the presence AS by another UE; the method includes receiving a request from the Presence AS to fetch the updated capabilities of the UE, when the UE is not able to update its capabilities to Presence AS using refresh publish during power saving mode. Further, transmitting a push notification to UE to fetch its updated capabilities; receiving the updated capabilities of UE in response to the push notification; and updating the updated capabilities of UE-A at the Presence AS.

Another object of the embodiments herein is to disclose method and apparatus for optimizing resources in an IP multimedia subsystem (IMS) network, a method includes receiving a service request from an IMS client when the UE's registration with the IMS network is expired. Further, the method includes transmitting the service request from the IMS client to the UE using push notifications through a PNT server. Further, the method includes receiving a metadata (e.g., delivery or a display notification or anything relevant thereof) to the received service request as a response to the push notification or any other non-IMS signaling path.

Another object of the embodiments herein is to disclose method and apparatus for optimizing resources in a IMS network, a method includes during an incoming/active call, receiving an incoming OPTIONS Capability Discovery request with in-call features capability from an IMS client through the PNT server, when the UE's registration with the IMS network is expired; receiving capabilities of the IMS client using push notification through the PNT server; determining whether the IMS client is capable of in-call service, based on the received in-call features capability; registering with the IMS network, if the IMS client is capable of in-call service.

Accordingly the embodiments herein provide method and apparatus for optimizing resources in an IP multimedia subsystem (IMS) network, a method includes receiving one or more contact book details from a user equipment (UE) to fetch one or more contact books from a network contact book stored in at least one of the IMS network and a third party server, wherein the IMS network includes at least one of the OPTIONS AS and a presence AS. Further, the method includes receiving capabilities of the contacts present in the one or more contact books in response to a request sent by the OPTIONS AS to the contacts present in the one or more contact books. Further, the method includes aggregating the capabilities of the contacts present in the one or more contact books. Further, the method includes transmitting the aggregated at least one capabilities of the contacts present in the one or more contact books to the UE through a PNT server. In an embodiment, wherein transmitting by the Presence AS, aggregated capabilities of the contacts to the UE through the PNT server using push notifications.

In an embodiment, wherein fetching an updated capabilities of the UE by the presence AS through the PNT server includes, receiving a request from the presence AS to fetch the updated capabilities of the UE, when the UE is not able to update the capabilities of the UE using refresh PUBLISH during power saving mode; transmitting a push notification to the UE to fetch the updated capabilities of the UE; receiving the updated capabilities of the UE in response to the push notification; and updating the updated at least one capability of the UE at the presence AS.

Accordingly the embodiments herein provide method and apparatus for optimizing resources in an IP multimedia subsystem (IMS) network, a method includes receiving a service request from an IMS client when the UE's registration with the IMS network is expired. Further, the method includes transmitting the service request from the IMS client to the UE using push notifications through a PNT server. Further, the method includes receiving a metadata (e.g., delivery or a display notification or anything relevant thereof) to the received service request as a response to the push notification or any other non-IMS signaling path.

Accordingly the embodiments herein provide method and apparatus for optimizing resources in an IP multimedia subsystem (IMS) network, a method includes receiving an incoming OPTIONS capability discovery request with in-call features capability from an IMS client through the PNT server, when the UE's registration with the IMS network is expired. Further, the method includes determining whether the IMS client is capable of in-call service, based on the received in-call features capability. Further, the method includes registering with the IMS network, if the IMS client is capable of in-call service.

Accordingly the embodiments herein provide an IP multimedia subsystem (IMS) network for optimizing resources, the IMS network comprising an OPTIONS applications server (AS) configured to receive one or more contact book details from a user equipment (UE) to fetch one or more contact books from a network contact book stored in at least one of the IMS network and a third party server, wherein the IMS network includes at least one of the OPTIONS AS and a presence AS. Further, the OPTIONS applications server (AS) configured to receive capabilities of the contacts present in the one or more contact books in response to a request sent by the OPTIONS AS to the contacts present in the one or more contact books. Further, the OPTIONS applications server (AS) configured to aggregate the capabilities of the contacts present in the one or more contact books. Further, the OPTIONS applications server (AS) configured to transmit the aggregated capabilities of the contacts present in the one or more contact books to the UE through a PNT server. In an embodiment, wherein the Presence AS can be configured to transmit the aggregated capabilities of the contacts to the UE through the PNT server using push notifications.

In an embodiment, wherein the presence AS can be configured to fetch an updated capabilities of the UE through the PNT server by, receiving a request from the presence AS to fetch the updated capabilities of the UE, when the UE is not able to update the capabilities of the UE using refresh PUBLISH during power saving mode; transmitting a push notification to the UE to fetch the updated capabilities of the UE; receiving the updated capabilities of the UE in response to the push notification; and updating the updated at least one capability of the UE at the presence AS.

Accordingly the embodiments herein provide an IP multimedia subsystem (IMS) network for optimizing resources, the IMS network (100) configured to receive at least one service request from an IMS client when the UE's registration with the IMS network (100) is expired. Further, the IMS network configured to transmit the at least one service request from an IMS client to the UE using push notifications through a push notification (PNT) server. Further, the IMS network configured to receive a metadata in response to the received at least one service request using push notifications through the PNT server.

Accordingly the embodiments herein provide an user equipment (UE) for optimizing resources in an IP multimedia subsystem (IMS) network, the UE comprising a capability discovery manager configured to receive an incoming OPTIONS with an in-call features capability from an IMS client through the push notification (PNT) server, when the UE's registration with the IMS network is expired. Further, the capability discovery manager configured to determine whether the IMS client is capable of in-call service, based on the received in-call features capability. Further, the UE comprising an IMS registration manager configured to register the UE with the IMS network, if the IMS client is capable of in-call service.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 1 is a block diagram illustrating units of an IMS network for optimizing resources, according to embodiments as disclosed herein;

FIG. 2 is a block diagram illustrating units of a user equipment (UE) for optimizing resources, according to embodiments as disclosed herein;

FIG. 3 is a flow diagram illustrating a method for optimizing resources in an IMS network, according to embodiments as disclosed herein;

FIG. 4 is a flow diagram illustrating a method for optimizing resources in an IMS network, according to embodiments as disclosed herein;

FIG. 5 is a flow diagram illustrating a method for optimizing resources by a UE in an IMS network, according to embodiments as disclosed herein.

FIG. 6a is a sequence diagram illustrating a call flow for optimized OPTIONS based capability discovery using push notifications, according to embodiments as disclosed herein;

FIG. 6b is a sequence diagram illustrating a call flow for optimized PRESENCE based capability discovery by using push notifications, according to embodiments as disclosed herein;

FIG. 7 is a sequence diagram illustrating a call flow for maintaining up-to-date capabilities of UEs in PRESENCE based capability discovery for non-native rich communication services (RCS) applications, according to embodiments as disclosed herein;

FIG. 8 is a sequence diagram illustrating a call flow for reducing IMS traffic when the user is idle during 1-1 chat and group chat sessions, according to embodiments as disclosed herein;

FIG. 9 is a sequence diagram illustrating a call flow for reducing IMS traffic during In-Call services, according to embodiments as disclosed herein.

MODE FOR THE INVENTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve methods and systems for optimizing resources in an IP multimedia subsystem (IMS) network by leveraging Push Notification Enablers, wherein a method includes receiving contact book(s) details from user equipment (UE) to fetch contact book(s) from a network contact book stored in the IMS network or any other third party server. Further, the method includes receiving capabilities of the contacts present in the contact book in response to a request sent by the OPTIONS Application Server (AS) to the contacts present in the contact book. Further, the method includes aggregating the capabilities of the contacts present in the contact book. Further, the method includes transmitting the aggregated capabilities of the contacts present in the contact book to the UE through a PNT server. Referring now to the drawings, and more particularly to FIGS. 1 through 9, where similar reference characters denote corresponding features consistently throughout the figures, there are shown example embodiments.

FIG. 1 is a block diagram illustrating units of an IMS network for optimizing resources, according to embodiments as disclosed herein.

In an embodiment, the IMS network 100 includes an OPTIONS application server (AS) 102, a presence applications server (AS) 104, a communication interface unit 106 and a memory 108. The OPTIONS AS 102 can be configured to receive one or more contact book details from user equipment (UE) to fetch one or more contact books from a network contact book stored in at least one of the IMS network 100 and a third party server. The OPTIONS AS can be disclosed as a first AS and the Presence AS can be disclosed as a second AS.

Further, the OPTIONS AS 102 can be configured to receive capabilities of the contacts present in the one or more contact books in response to a request sent by the OPTIONS AS 102 to the contacts present in the one or more contact books. Further, the OPTIONS AS 102 can be configured to aggregate the at least one capabilities of the contacts present in the one or more contact books. Further, the OPTIONS AS 102 can be configured to transmit the aggregated capabilities of the contacts present in the one or more contact books to the UE through a PNT server.

In an embodiment, the presence AS 104 can be configured to transmit the aggregated capabilities of the contacts present in the one or more contact books to the UE, which includes aggregating the capabilities of the contacts present in the one or more contact books, wherein the capabilities can be published by the contacts present in the one or more contact books at the presence AS 104. Further, the aggregated at least one capabilities of the contacts can be sent to the UE through a PNT server using push notifications (PNTs).

In an embodiment, the method includes fetching updated capabilities of the UE from the presence AS 104 by another UE. The method includes receiving a request from the presence AS 104 to fetch the updated capabilities of the UE, when the UE is not able to update the capabilities of the UE using refresh PUBLISH during power saving mode. Further, the method includes transmitting a push notification to the UE to fetch the updated capabilities of the UE. Further, the method includes receiving the updated capabilities of the UE in response to the push notification. Further, the method includes updating the updated capabilities of the UE at the presence AS 104.

The communication interface unit 106 can be configured to establish communication with the UEs and the PNT server to exchange information.

The memory 108 can be configured to store network contact books and other information required to optimize the IMS network resources. The memory 108 may include one or more computer-readable storage media. The memory 108 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 108 may, in some examples, be considered a non-transitory storage medium. The term "non-transitory" may indicate that the storage medium is not embodied in a carrier wave or a propagated signal. However, the term "non-transitory" should not be interpreted to mean that the memory 108 is non-movable. In some examples, the memory 108 can be configured to store larger amounts of information than the memory. In certain examples, a non-transitory storage medium may store data that can, over time, change (e.g., in Random Access Memory (RAM) or cache).

FIG. 1 shows exemplary units of the IMS network 100, but it is to be understood that other embodiments are not limited thereon. In other embodiments, the IMS network 100 may include less or more number of units. Further, the labels or names of the units are used only for illustrative purpose and does not limit the scope of the embodiments herein. One or more units can be combined together to perform same or substantially similar function in the IMS network 100.

FIG. 2 is a block diagram illustrating units of user equipment (UE) for optimizing resources, according to embodiments as disclosed herein.

In an embodiment, the UE 200 can be at least one of, but not restricted to, a mobile phone, a smart phone, tablet, a phablet, a personal digital assistant (PDA), a laptop, a computer, a wearable computing device, a vehicle infotainment system, or any other device that can communicate using an IMS network 100. The UE 200 includes a Capability Discovery Manager 202, an IMS Registration Manager 204, a communication interface unit 206 and a memory 208.

The capability discovery manager 202 can be configured to receive incoming OPTIONS with an in-call features capability during an incoming/ongoing call from an IMS client through the PNT server, when the registration of the UE with the IMS network is expired. The in-call features include an image share, a video share, a shared map/sketch details or the like in an established voice call. The IMS client can be at least one of, but is not limited to a mobile phone, a smart phone, tablet, a phablet, a personal digital assistant (PDA), a laptop, a computer, a wearable computing device, a vehicle infotainment system, or the like. Further, the capability discovery manager 202 can be configured to determine whether the IMS client is capable of in-call service, based on the received in-call features capability. On determining that the IMS client is capable of in-call service, then the IMS registration manager 204 can be configured to register the UE 200 with the IMS network 100. Thus, IMS registration triggers the UE 200 to register with the IMS network, so that the UE 200 can be used during In-Call services in order to avoid maintaining un-necessary IMS registrations.

In an embodiment, some of the push notifications are introduced, which includes image sharing (ISH), video sharing (VSH), Shared Map, Shared Sketch sessions. The UE 200 shall perform IMS Registration only when the UE 200 receives any of this PNTs. Alternatively, the UE 200 may perform IMS registration only when incoming OPTIONS PNT has ISH/VSH/Shared Map/Shared Sketch capabilities.

The communication interface unit 206 can be configured to establish communication with IMS network 100, other UEs, and the PNT server to exchange information.

The memory 208 can be configured to store network contact books and other information required to optimize the IMS network resources. The memory 208 may include one or more computer-readable storage media. The memory 208 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 208 may, in some examples, be considered a non-transitory storage medium. The term "non-transitory" may indicate that the storage medium is not embodied in a carrier wave or a propagated signal. However, the term "non-transitory" should not be interpreted to mean that the memory 208 is non-movable. In some examples, the memory 208 can be configured to store larger amounts of information than the memory. In certain examples, a non-transitory storage medium may store data that can, over time, change (e.g., in Random Access Memory (RAM) or cache).

FIG. 2 shows exemplary units of the UE 200, but it is to be understood that other embodiments are not limited thereon. In other embodiments, the UE 200 may include less or more number of units. Further, the labels or names of the units are used only for illustrative purpose and does not limit the scope of the embodiments herein. One or more units can be combined together to perform same or substantially similar function in the UE 200.

FIG. 3 is a flow diagram 300 illustrating a method for optimizing resources in an IMS network 100, according to embodiments as disclosed herein.

At step 302, the method includes receiving contact book details from the UE 200 to fetch one or more contact books from a network contact book stored in at least one of the IMS network 100 and a third party server. The method allows the OPTIONS AS 102 to receive the contact book details from the UE 200 to fetch one or more contact books from the network contact book stored in at least one of the IMS network 100 and a third party server. The IMS network 100 includes at least one of the OPTIONS AS 102 and the presence AS 104.

At step 304, the method includes receiving capabilities of the contacts present in the one or more contact books in response to a request sent by the OPTIONS AS 102 to the contacts present in the one or more contact books. The method allows the OPTIONS AS 102 to receive capabilities of the contacts present in the one or more contact books in response to the request sent by the OPTIONS AS 102 to the contacts present in the one or more contact books.

At step 306, the method includes aggregating the capabilities of the contacts present in the one or more contact books. The method allows the OPTIONS AS 102 to aggregate the capabilities of the contacts present in the one or more contact books.

At step 308, the method includes transmitting the aggregated capabilities of the contacts present in the one or more contact books to the UE 200 through the PNT server. The method allows the OPTIONS AS 102 to transmit aggregated capabilities of the contacts present in the one or more contact books to the UE through a PNT server.

The various actions, acts, blocks, steps, or the like in the method and the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

In an embodiment, transmitting the aggregated capabilities of the contacts present in the one or more contact books to the UE 200 by the Presence AS 104 includes; aggregating the capabilities of the contacts present in the one or more contact books, wherein the capabilities can be published by the contacts present in the one or more contact books at the Presence AS 104. Further, the aggregated at least one capabilities of the contacts can be sent to the UE through a PNT server using push notifications (PNTs).

In an embodiment, the method includes fetching updated capabilities of the UE to the presence AS 104 by the PNT server includes receiving a request from the Presence AS 104 to fetch the updated capabilities of the UE 200, when the UE 200 is not able to update the capabilities of the UE 200 using refresh PUBLISH during power saving mode. Further, the method includes transmitting a push notification to the UE to fetch the updated capabilities of the UE 200. Further, the method includes receiving the updated capabilities of the UE 200 in response to the push notification. Further, the method includes updating the updated capabilities of the UE at the presence AS 104.

FIG. 4 is a flow diagram 400 illustrating a method for optimizing resources in an IMS network, according to embodiments as disclosed herein.

At step 402, the method includes receiving at least one service request (for example, message, image, video or the like) from an IMS client when the UE's 200 registration with the IMS network is expired. The method allows the IMS network 100 to receive at least one service request from an IMS client when the UE's 200 registration with the IMS network 100 is expired.

At step 404, the method includes transmitting the at least one service request from the IMS client to the UE 200 using push notifications through the PNT server. The method allows the IMS network 100 to transmit the at least one service from the IMS client to the UE 200 using push notifications through a PNT server.

At step 406, the method includes receiving a metadata (e.g., delivery and or a display notification or anything relevant thereof) to a received at least one service using push notifications through the PNT server. The method allows the IMS network 100 to Receive at least one of metadata to a received at least one service using push notifications through the PNT server.

The various actions, acts, blocks, steps, or the like in the method and the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a flow diagram 500 illustrating a method for optimizing resources by a UE in an IMS network, according to embodiments as disclosed herein.

At step 502, the method includes receiving incoming OPTIONS with an in-call features capability from an IMS client through the PNT server. The method allows the Capability Discovery Manager 202 to receive the incoming OPTIONS with the in-call features capability from the IMS client through the PNT server.

At step 504, the method includes determining whether the IMS client is capable of in-call service based on the received in-call features capability. The method allows the Capability Discovery Manager 202 to determine whether the IMS client is capable of in-call service, based on the received in-call features capability.

At step 506, the method includes registering the UE with the IMS network, if the IMS client is capable of in-call service. The method allows the IMS Registration Manager 204 to register the UE with the IMS network, if the IMS client is capable of in-call service.

The various actions, acts, blocks, steps, or the like in the method and the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

FIG. 6a is a sequence diagram illustrating a call flow for optimized OPTIONS based capability discovery using push notifications, according to embodiments as disclosed herein.

Initially, UE-A 200 can be configured to synchronize all contacts to a Network Address Book (NAB) 602, whenever the UE-A 200 detects a change to its local address book (S601). The UE-A 200 as per GSMA RCS, fetches the RCS capabilities of all contacts in an address book in certain cases like boot up registration, Polling timer expiry or the like (S603). Further, the UE-A 200 can be configured to transmit SIP OPTIONS carrying address book details to OPTIONS AS 102 (S605). Further, the UE-A 200 receives 200OK response from the OPTIONS AS 102 (S607). Further, the OPTIONS AS 102 can be configured to fetch all contacts from the NAB 602 (S609). On receiving the contacts details from the NAB 602, the OPTIONS AS 102 can be configured to transmit SIP OPTIONS request to all the contacts available in the contact book (for example, UE-B and UE-C) (S611, 613). In an embodiment, push notifications (PNTs) can be sent instead of the SIP OPTIONS to UEs (i.e., UE-B and UE-C), which are internally deregistered and supports PNT. The OPTIONS AS 102 can be configured to transmit SIP OPTIONS to UE-B 606 along with capabilities of the UE-A 200. Further, on receiving SIP OPTIONS at the UE-B 606, the UE-B 606 can be configured to transmit 200OK response including its capabilities to OPTIONS AS 102 (S615). Further, the OPTIONS AS 102 can be configured to transmit SIP OPTIONS to UE-C 608 including capabilities of the UE-A 200. Further, on receiving SIP OPTIONS at the UE-C 608, the UE-C 608 can be configured to transmits 200OK response including its capabilities to OPTIONS AS 102 (S617). Further, on receiving SIP OPTIONS and capabilities of the UE-B 606 and UE-C 608 at OPTIONS AS 102, the OPTIONS AS 102 can be configured to aggregate capabilities of the UE-B 606 and UE-C 608 (S619). Further, the OPTIONS AS 102 can be configured to share the aggregated capabilities of UE-B 606 and UE-C 608 to the PNT server 604. Further, the PNT server 608 can be configured to push the aggregated capabilities of the UE-B 606 and UE-C 608 to the UE-A 200 (S621). As aggregated capabilities data is sent through non-IMS network, it will reduce the load on the IMS network 100.

FIG. 6b is a sequence diagram illustrating a call flow for optimized PRESENCE based capability discovery by using push notifications, according to embodiments as disclosed herein. Initially, the UE-A 200 can be configured to synchronize all contacts to Network Address Book (NAB) 602, whenever the UE-A 200 detects a change in its local address book (S631). Further, the UE-B 606 can PUBLISH its capabilities to Presence AS 104 (S633). Further, on receiving the UE-B's 606 capabilities to the presence AS 104, the presence AS 104 can be configured to transmit a 200OK response for the UE-B 606 (S635). Further, UE-C 608 PUBLISH its capabilities to the Presence AS 104 (S637) and then the UE-C 608 receives 200OK response for its PUBLISH message (S639). As per GSMA RCS guideline, the UE 200 can be configured to fetch the RCS capabilities of all the contacts in the address book in certain cases like boot-up registration, Polling timer expiry or the like (S641). The UE-A 200 can be configured to transmit SUBSCRIBE message with details of Network Address Book to the Presence AS 104 (S643). Further, the UE-A 200 can be configured to receive 200OK response from the Presence AS 104 (S645). The Presence AS 104 can be configured to fetch all contacts from the Network Address Book 602 (S647). Further, on receiving contacts details of all the contacts, the Presence AS 104 can be configured to aggregate capabilities of all the contacts based on the earlier published data and shares the aggregated capabilities of all the contacts with PNT server 604 to push the capabilities to the UE-A 200 (S649). The PNT server 604 on receiving the aggregated capabilities of all the contacts can be configured to transmit the aggregated capabilities to the UE-A 200 (S651). As the aggregated capabilities data is sent through non-IMS network, it will reduce the load on the IMS network 100.

FIG. 7 is a sequence diagram illustrating a call flow for maintaining up-to-date capabilities of UEs in PRESENCE based Capability Discovery for non-native rich communication services (RCS) applications, according to embodiments as disclosed herein.

The UE-A 200 is successfully registered on the IMS network 100 after boot-up (S701). Further, the UE-A 200 can be configured to PUBLISH its capabilities to the Presence AS 104 by transmitting SIP PUBLISH request (S703). Further, on receiving the UE-A's 200 capabilities successfully at the Presence AS 104, the UE-A 200 can be configured to receive 200OK response for the PUBLISH message from the Presence AS 104 (S705). Further, the UE-A 200 can be configured to start refresh timer to transmit refresh PUBLISH to the Presence AS 104. The UE-A 200 can be configured to enter into a power saving mode (doze mode), where all interactions with the IMS network 100 may be suspended. Further, the UE-B 606 can be configured to initiate a SUBSCRIBE message for the UE-A 200 to receive the UE-A's 200 capabilities (S707). On receiving the SUBSCRIBE message, the UE-A 200 can be configured transmit 200OK response to the UE-B 606 (S709). Further, based on the UE-B's 606 SUBSCRIBE message, the presence AS 104 can be configured to notify the published capabilities of UE-A 200 to UE-B 606 through NOTIFY message (S711) and further receive a 200OK response from UE-B 606 (S713). Further, a refresh timer is fired at the UE-A 200 during doze mode/power saving mode, the UE-A 200 is not be able to transmit refresh PUBLISH to Presence AS 104 due to limited access to network communication. This results in capability expiry of the UE-A 200 at the Presence AS 104. Once the capability gets expired, if any SUBSCRIBE requests are received for the UE-A 200, the presence AS 104 may notify that the UE-A 200 doesn't have any capabilities. If the capability of the UE-A 200 expired at Presence AS 104, the Presence AS 104 can request the PNT server 604 to fetch the capabilities of the UE-A 200 (S715). Further, the PNT server 604 can be configured to transmit a push notification (PNT) to the UE-A 200 (S717). Further, the UE-A 200 can be configured to transmit its capabilities in response to the PNT (S719). Further, the PNT server 604 can be configured to update latest capabilities of the UE-A 200 to the Presence AS 104 (S721). Further, the UE-B 606 can subscribe for the UE-A's 200 capabilities (S723) and then the UE-B 606 receives 200OK response for its SUBSCRIBE message (S725). On subscribing, the presence AS 104 can be configured to notify the latest fetched capabilities of the UE-A 200 to the UE-B 606 (S727) and then the UE-B 606 receives 200OK response for its notify message (S729). Although the UE-A's 200 network access is limited, its capabilities can be up-to-date at the presence-AS 104.

FIG. 8 is a sequence diagram illustrating a call flow for reducing IMS traffic when the user is idle during 1-1 chat and group chat sessions, according to embodiments as disclosed herein. When the UE-A 200 is successfully registered on to the IMS network 100 (S803) after boot-up (S801). The UE-A 200 can be configured to register for PNT server 604 to receive PNT notifications for RCS applications (S805). Further, the UE-A 200 de-registers from the IMS network 100 after register timer expiries (S807). Further, the IMS network 100 (i.e., IM AS) receives incoming chat message "Message 1" (S809). Since UE-A 200 is not in registered state, the IM AS 100 requests the PNT server 604 to forward the message in a push notification (PNT) to the UE-A 200 (S811, S813). Further, the PNT server 604 pushes the message to the UE-A 200. Further, the UE-A 200 responds with delivery/display report(s) of the message in Push Notification response (S815). Similarly, the IM AS 100 receives incoming messages "Message 2" and "Message 3" (S817, S819). Since UE-A 200 is not in registered state, the IM AS 100 requests the PNT server 604 to forward the Message 2" and "Message 3" in a push notification (PNT) to the UE-A 200 (S821, S823). Further, the PNT server 604 pushes the message to the UE-A 200. Further, the UE-A 200 responds with delivery/display report(s) for the message 2" and "message 3" in Push Notification response (S825). Further, when the UE-A 200 replies to the received messages (S827), it triggers the UE-A 200 to register with the IMS network 100 (S829). The IM AS 100 receives incoming messages "Message 4" (S831). Further, exchange of any messages after registering with the IMS network 100 happens over SIP/Message Session Relay Protocol (MSRP) (S833, S835).

FIG. 9 is a sequence diagram illustrating a call flow for reducing IMS traffic during In-Call services, according to embodiments as disclosed herein.

When the UE-A 200 is successfully registered on the IMS network 100 (S903) after boot-up (S901). The UE-A 200 registers for PNT to receive PNT notifications for RCS application (S905). Further, the UE-A 200 de-registers from the IMS network 100 after the register timer expires (S907). Further, the IMS network 100 (i.e., IMS AS) receives an incoming call from a remote UE (call can be CS or PS) (S909). Further, the UE-A 200 accepts the call received through the IMS network 100 (S911). Further, the IMS AS (i.e., OPTIONS AS) 100 receives SIP OPTIONS with In-Call features capability (S913). Since, the UE-A 200 is not IMS registered, the IMS AS requests the PNT server 604 to transmit remote UE (caller) capability to UE-A 200 (callee) in PNT through PNT server 604 (S915, S917). Further, the UE-A 200 responds with its capability to the PNT server 604 (S919). Since remote UE supports In-Call services, the UE-A 200 registers with the IMS network 100 and enables services to user (S921). Further, if the UE-A 200 receives any incoming In-Call request (S923, S925), the UE-A 200 directly receives the in-call request and participates in the in-call service Session (S927).

The embodiments disclosed herein can be implemented through at least one software program running on at least one hardware device and performing network management functions to control the elements. The elements shown in FIG. 1 and FIG. 2 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:
1. A method for optimizing resources in an IP multimedia subsystem (IMS) network, the method comprising:

receiving, by a first application server (AS), details of at least one contact book from a user equipment (UE) to fetch at least one contact book from a network contact book stored in at least one of the IMS network and a third party server, wherein the IMS network includes at least one of the first AS and a second AS;

receiving, by the first AS, at least one multimedia sharing capability of the at least one contact present in the at least one contact book in response to a request sent by the first AS to the at least one contact present in the at least one contact book, wherein the at least one multimedia sharing capability comprises an image sharing capability, a video sharing capability, and a map sharing capability, performed by the at least one contact during an established voice call;

aggregating, by the first AS, the at least one multimedia sharing capability of the at least one contact present in the at least one contact book; and transmitting, by the first AS, the aggregated at least one multimedia sharing capability of the at least one contact present in the at least one contact book to a push notification (PNT) server, for the PNT server to deliver the aggregated at least one multimedia sharing capability to the UE without using the IMS network.

2. The method of claim 1, wherein transmitting the aggregated at least one multimedia sharing capability of the at least one contact present in the at least one contact book to the UE by the second AS includes:

aggregating the at least one multimedia sharing capability of the at least one contact present in the at least one contact book, wherein the at least one multimedia sharing capability is published by the at least one contact present in the at least one contact book at the second AS; and transmitting the aggregated at least one multimedia sharing capability of the at least one contact to the UE through the PNT server using push notifications.

3. The method of claim 2, wherein fetching an updated at least one multimedia sharing capability of the UE by the second AS through the PNT server includes:

receiving a request from the second AS to fetch the updated at least one multimedia sharing capability of the UE, when the UE is not able to update the at least one multimedia sharing capability of the UE using refresh PUBLISH during power saving mode;

transmitting a push notification to the UE to fetch the updated at least one multimedia sharing capability of the UE;

receiving the updated at least one multimedia sharing capability of the UE in response to the push notification; and updating the updated at least one capability of the UE at the second AS.

4. An apparatus in an IP multimedia subsystem (IMS) network for optimizing resources, the apparatus comprising:

a first applications server (AS) configured to:

receive details of at least one contact book from a user equipment (UE) to fetch at least one contact book from a network contact book stored in at least one of the IMS network and a third party server, wherein the IMS network includes at least one of the first AS and a second AS;

receive at least one multimedia sharing capability of the at least one contact present in the at least one contact book in response to a request sent by the first AS to the at least one contact present in the at least one contact book, wherein the at least one multimedia sharing capability comprises an image sharing capability, a video sharing capability, and a map sharing capability, performed by the at least one contact during an established voice call;

aggregate the at least one multimedia sharing capability of the at least one contact present in the at least one contact book; and transmit the aggregated at least one multimedia sharing capability of the at least one contact present in the at least one contact book to push notification (PNT) server, for the PNT server to deliver the aggregated at least one multimedia sharing capability to the UE without using the IMS network.

5. The apparatus of claim 4, wherein the second AS is configured to transmit the aggregated at least one multimedia sharing capability of the at least one contact present in the at least one contact book to the UE by:

aggregating the at least one multimedia sharing capability of the at least one contact present in the at least one contact book, wherein the at least one multimedia sharing capability is published by the at least one contact present in the at least one contact book at the second AS; and transmitting the aggregated at least one multimedia sharing capability of the at least one contact to the UE through the PNT server using push notifications.

6. The apparatus of claim 5, wherein the second AS is configured to fetch an updated at least one multimedia sharing capability of the UE through the PNT server by:

receiving a request from the second AS to fetch the updated at least one multimedia sharing capability of the UE, when the UE is not able to update the at least one multimedia sharing capability of the UE using refresh PUBLISH during power saving mode;

transmitting a push notification to the UE to fetch the updated at least one multimedia sharing capability of the UE;

receiving the updated at least one multimedia sharing capability of the UE in response to the push notification; and updating the updated at least one multimedia sharing capability of the UE at the presence AS.

* * * * *